(12) United States Patent
Huang

(10) Patent No.: US 6,499,197 B1
(45) Date of Patent: *Dec. 31, 2002

(54) BUCKLE DEVICE WITH IMPROVED SAFETY

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,703

(22) Filed: Sep. 5, 2001

(51) Int. Cl.$^7$ .......................... A44B 11/00; B25B 25/00
(52) U.S. Cl. .................... 24/68 CD; 24/68 R; 24/68 E; 24/71 ST; 24/171; 24/909
(58) Field of Search ............................ 24/68 CD, 68 E, 24/68 A, 68 D, 68 R, 909, 265 AL, 170, 191, 193, 71 TD, 71 ST

(56) References Cited

U.S. PATENT DOCUMENTS

| | | | | | |
|---|---|---|---|---|---|
| 3,887,966 A | * | 6/1975 | Gley | .......................... | 24/68 CD |
| 3,913,977 A | * | 10/1975 | Takada | .......................... | 24/196 |
| 4,199,182 A | * | 4/1980 | Sunesson | .................. | 24/68 CD |
| 4,227,286 A | * | 10/1980 | Holmberg | ................ | 24/68 CD |
| 4,951,365 A | * | 8/1990 | Loyd | ........................ | 24/68 CD |
| 5,560,086 A | * | 10/1996 | Huang | ..................... | 24/68 CD |
| 5,655,623 A | * | 8/1997 | Skyba | ......................... | 182/116 |
| 6,158,092 A | * | 12/2000 | Huang | ..................... | 24/68 CD |

* cited by examiner

*Primary Examiner*—Victor Sakran
(74) *Attorney, Agent, or Firm*—Alan D. Kamrath; Rider, Bennett, Egan & Arundel

(57) ABSTRACT

A buckle device includes a main body, a rotational retaining device rotatably mounted to the main body, and a buckle having an end connected to the rotational retaining device to pivot therewith. The rotational retaining device includes a slit through which a free end of a strap is extended. A retaining member is mounted to the other end of the buckle and has an engaging portion for releasably engaging with an engaging section of the main body. The retaining member further includes an operative portion that is operable to disengage the engaging portion of the retaining member from the engaging section of the main body. The operative portion of the retaining member is located away from the free end of the strap when the buckle is in a retained position, thereby preventing inadvertent actuation of the operative portion of the retaining member.

1 Claim, 5 Drawing Sheets

A-A

B-B

BUCKLE DEVICE WITH IMPROVED SAFETY

BACKGROUND OF THE INVENTION

1. Field of the Invention

The present invention relates to a buckle device with improved safety for cargo trucks or the like.

2. Description of the Related Art

U.S. Pat. No. 6,158,092 issued on Dec. 12, 2000 discloses a buckle device comprising a main body, a rotational retaining means rotatably mounted to the main body, and a buckle having an end connected to the rotational retaining means to pivot therewith. The other end of the buckle includes an engaging plate releasably engaged with two engaging notches of the main body. The rotational retaining means includes two shaft halves having a slit therebetween through which a free end of a strap extends. The free end of the strap wraps around the shaft halves and extends through the slit between the shaft halves when the engaging plate on the buckle engages with the engaging notches of the main body. However, it was found that the engaging plate was apt to be inadvertently impinged and thus disengaged from the engaging notches of the main body. In addition, the engaging plate was also apt to be impinged by the strap as a result of improper operation. These deficiencies caused relative rotation between the buckle and the main body and thus resulted in accidents.

SUMMARY OF THE INVENTION

An object of the present invention is to provide an improved buckle device that has a different arrangement in which an operative portion of a retaining member for effecting release of the buckle is located away from the free end of the strap to thereby avoid inadvertent actuation of the retaining member of the buckle device.

A buckle device in accordance with the present invention comprises a main body, a rotational retaining device rotatably mounted to the main body, and a buckle having an end connected to the rotational retaining device to pivot therewith. The rotational retaining device includes a slit through which a free end of a strap is extended. A retaining member is mounted to the other end of the buckle and has an engaging portion for releasably engaging with an engaging section of the main body. The retaining member further includes an operative portion that is operable to disengage the engaging portion of the retaining member from the engaging section of the main body. The operative portion of the retaining member is located away from the free end of the strap when the buckle is in a retained position, thereby preventing inadvertent actuation of the operative portion of the retaining member.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
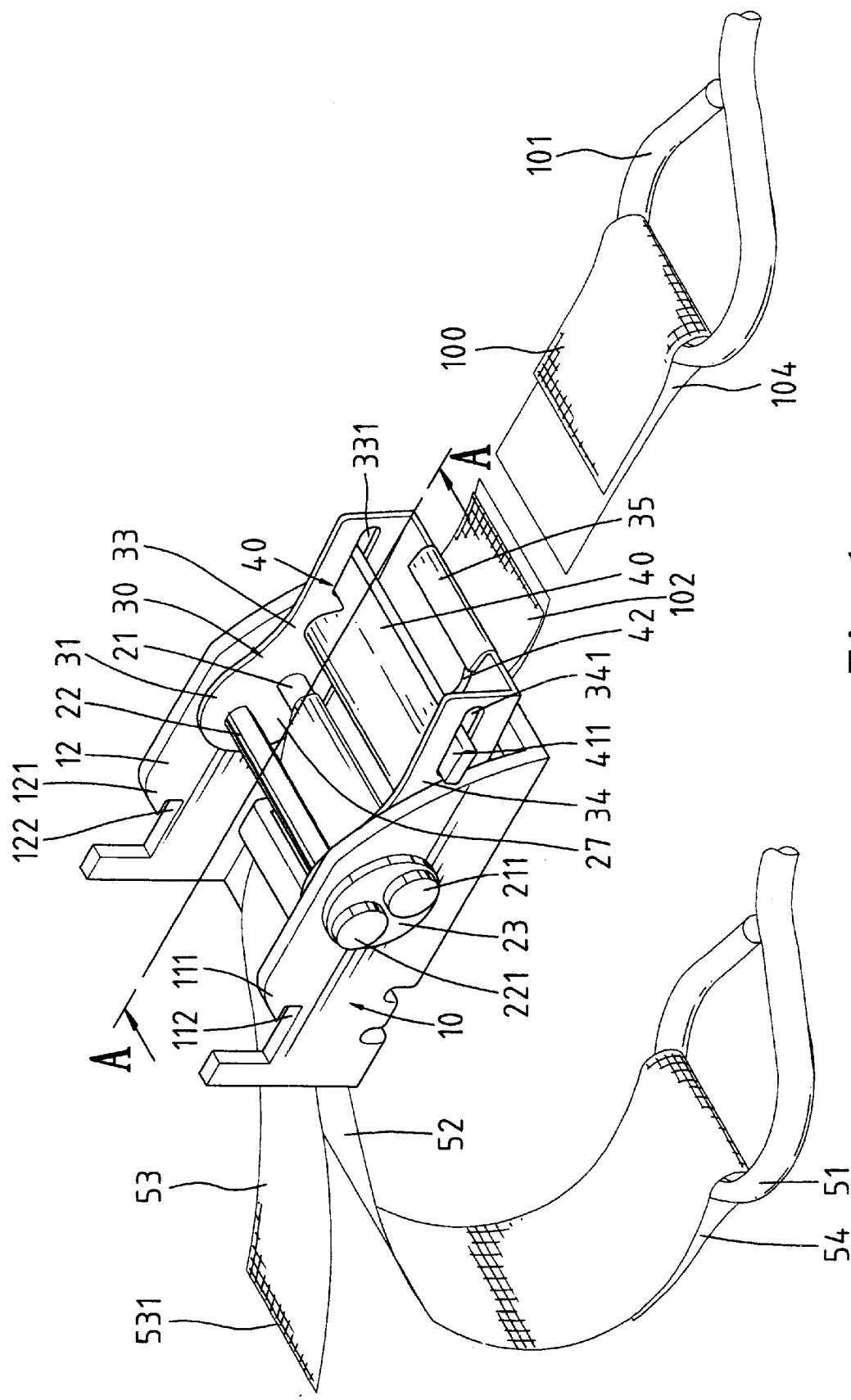
FIG. 1 is a perspective view of a buckle device in accordance with the present invention.
Figure 2:
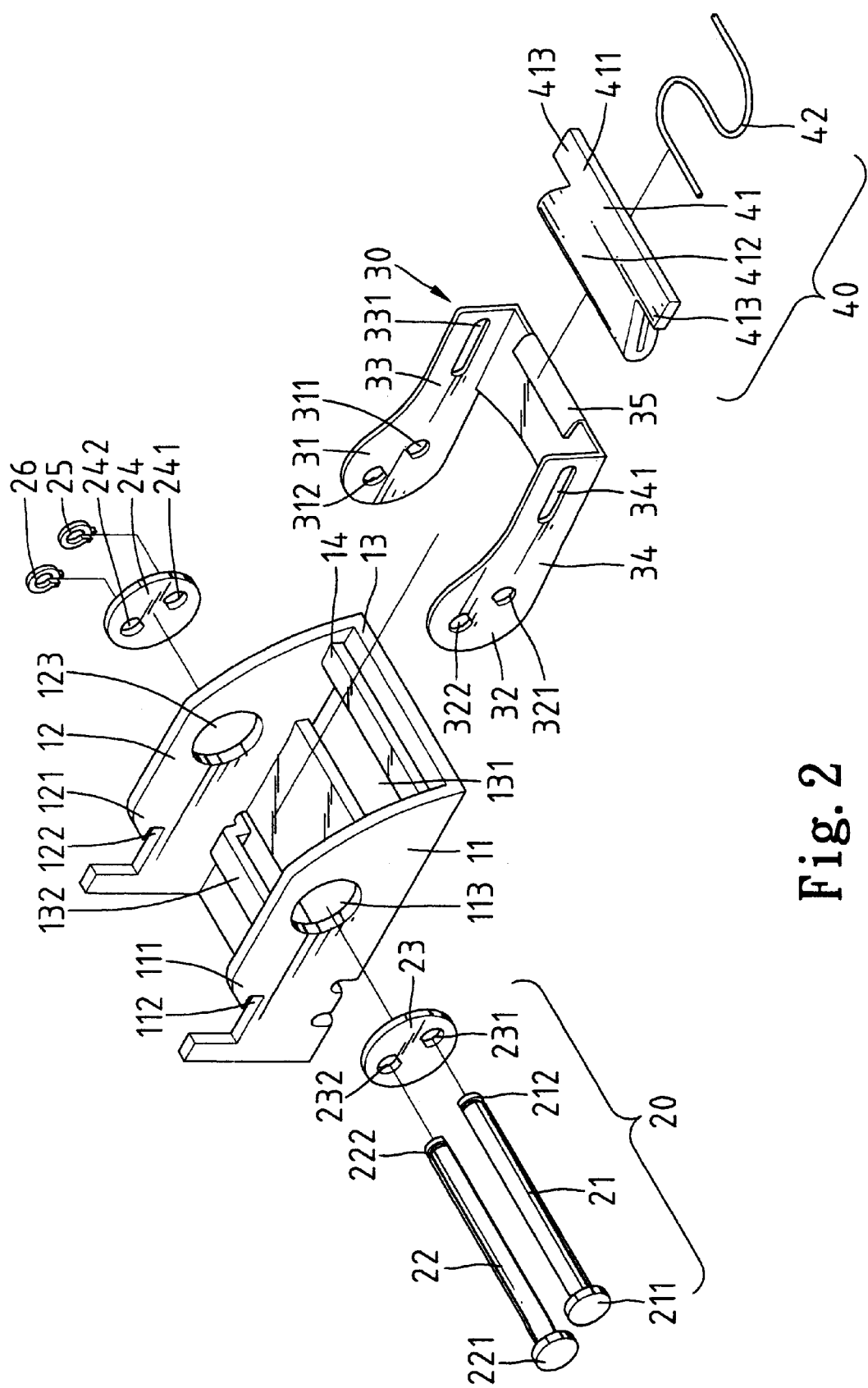
FIG. 2 is an exploded perspective view of the buckle device in accordance with the present invention.

Referring to FIGS. 1 through 5 and initially to FIGS. 1 and 2, a buckle device in accordance with the present invention generally includes a substantially U-shaped main body 10 having a bottom wall 13 and two side walls 11 and 12. Aligned holes 113 and 123 are defined in mediate portions of the side walls 11 and 12. An engaging section in the form of aligned engaging notches 112 and 122 awe defined in first ends of the side walls 11 and 12, each engaging notch 112, 122 having a hook 111, 121 formed on a wall thereof. A pin 14 extends between second ends of the side walls 11 and 12.

A rotational retaining means 20 is rotatably mounted between the side walls 11 and 12. The rotational retaining means 20 includes a first shaft 21 and a second shaft 22 each of which is non-circular in section. Each shaft 21, 22 includes an enlarged first end 211, 221 and a second end having an annular groove 212, 222. The rotational retaining means 20 further includes two side discs 23 and 24 each having two non-circular holes 231, 232; 241, 242. Each side disc 23, 24 has an outer diameter greater than an inner diameter of an associated one of the aligned holes 113 and 123 of the side walls 11 and 12. In assembly, each shaft 21, 22 is extended through an associated hole 231, 232 in the side disc 23 attached to an outer face of the associated side wall 11. Next, each shaft 21, 22 is extended through the aligned holes 113 and 123 and an associated hole 241, 242 in the side disc 24 attached to the outer face of the associated side wall 12. A retainer 25, 26 (such as a C-clip) is engaged in the annular groove 212, 222 of each shaft 21, 22 and thus retains the shaft 21, 22 in place. A slit 27 is defined between the shafts 21 and 22.

A buckle 30 includes two side walls 33 and 34 that have two pairs of aligned holes 311 and 321, 312 and 322 defined in first ends 31 and 32 thereof and aligned slots 331 and 341 defined in second ends thereof. The shafts 21 and 22 extend through the non-circular holes 311, 321, 312, and 322 such that the buckle 30 is secured to the rotational retaining means 20 to rotate therewith. A second retaining means 40 includes a retaining member 41 and an elastic member 42. The retaining member 41 comprises an engaging portion 411 and an operative portion 412 extended from the engaging portion 411.

Figure 3:
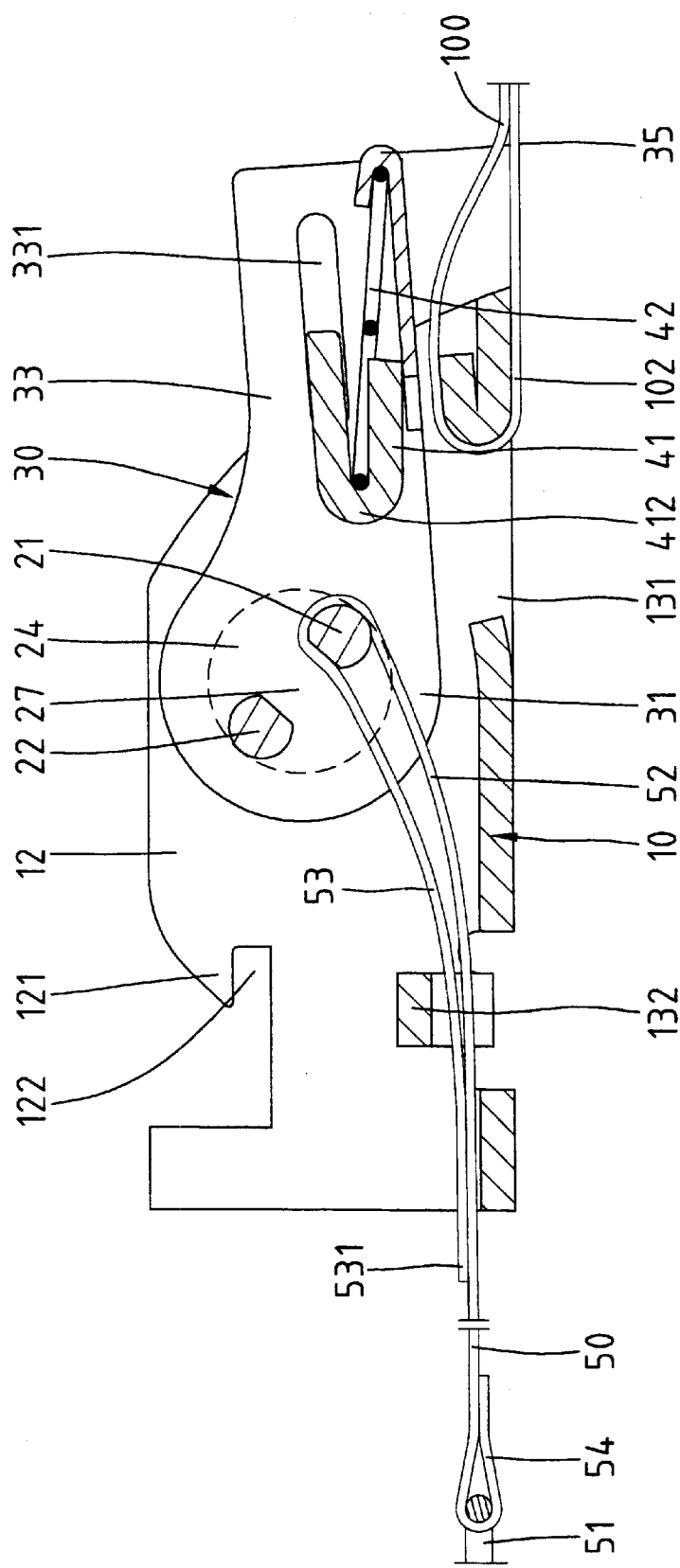
FIG. 3 is a sectional view taken along plane A—A in FIG. 1, wherein the buckle of the buckle device is in a released position.
Figure 4:
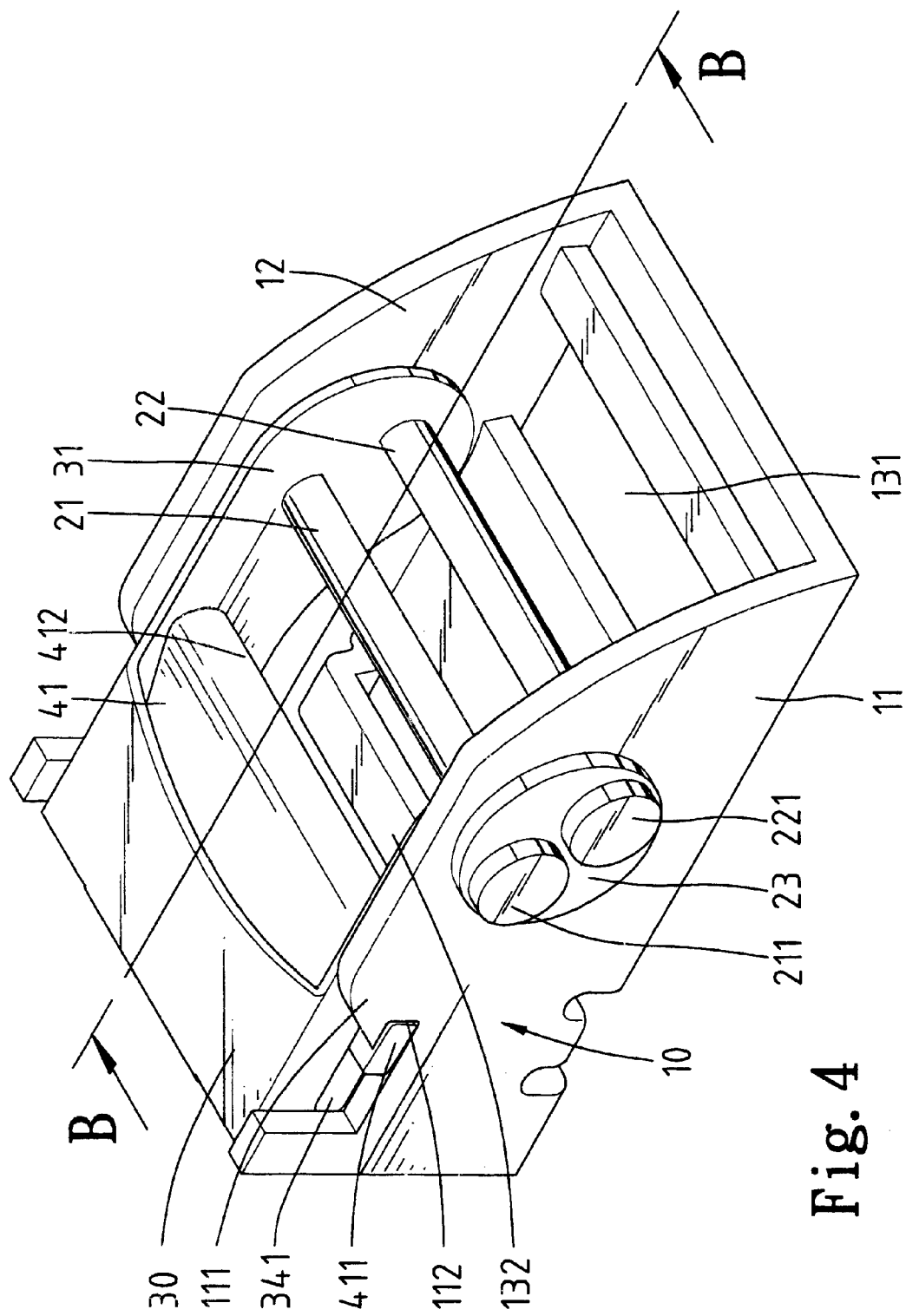
FIG. 4 is a perspective view of the buckle device, wherein the buckle is pivoted to a retained position.

In assembly, referring to FIGS. 1 through 3, two lateral ends 413 of the engaging portion 411 of the retaining member 41 are respectively extended through the slots 331 and 341 of the buckle 30. An end of the elastic member 42 is attached to the retaining member 41 and the other end of the elastic member 42 is attached to a stop 35 on the buckle 30. The side discs 23 and 24 and the shafts 21 and 22 are then assembled to the main body 10 in a manner described above.

As illustrated in FIG. 1, a first strap 100 includes a first end 102 extending through a slot 131 and wound around the pin 14 and a second end 104 to which a hook member 101 is attached so as to be hooked to, e.g., a cargo truck frame, which is conventional and therefore not described in detail. A second strap 50 includes a first end 54 to which a hook member 51 is attached so as to be hooked to, e.g., the cargo truck frame, which is conventional and therefore not described in detail. A free second end 531 of the straw 50 is extended into the main body 10, under a retainer 132 and wound through the slit 27 in a manner shown in FIG. 3 and then extended out of the main body 10.

Figure 5:
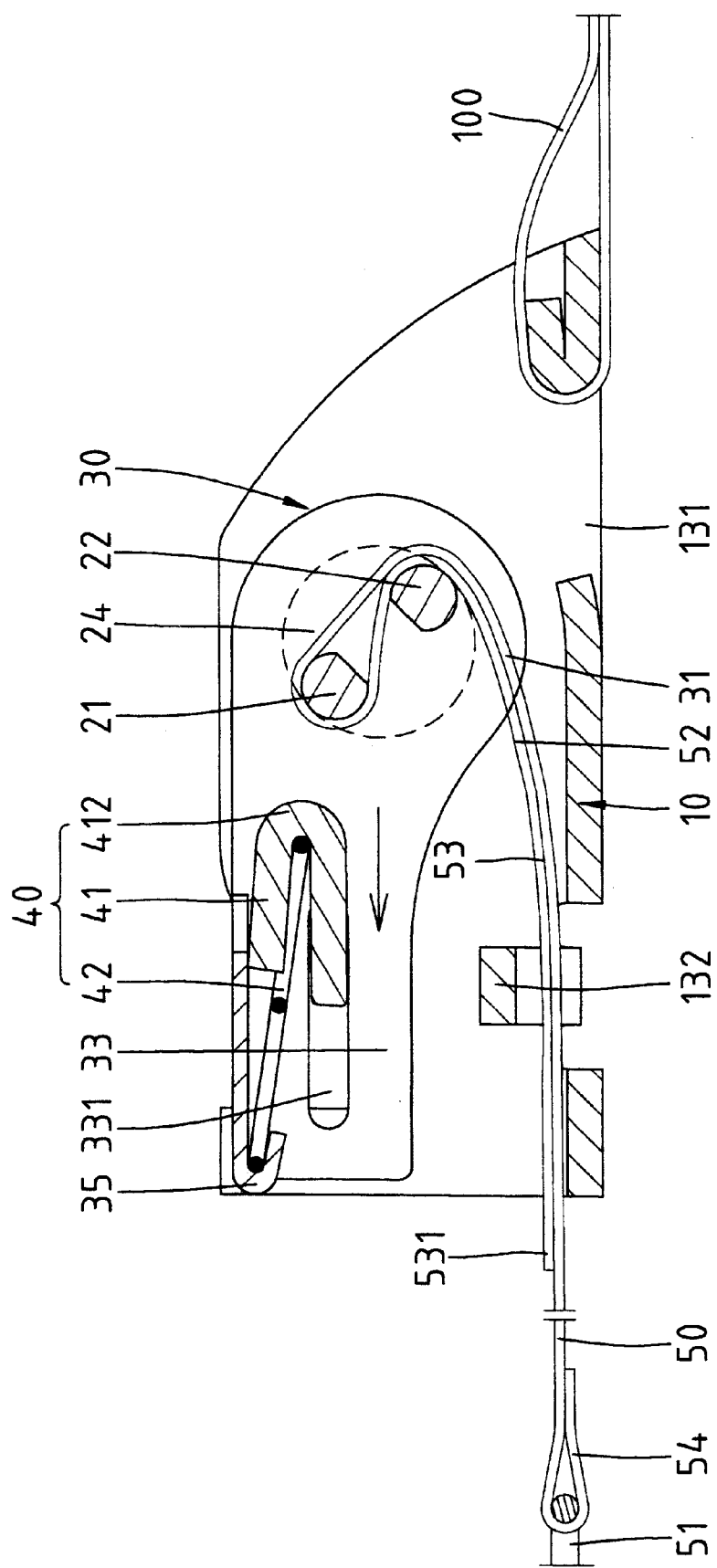
FIG. 5 is a sectional view taken along plane B—B in FIG. 4.

In use, the hook members 51 and 101 (FIG. 1) are hooked to the cargo truck frame (not shown), and the free end 531 of the strap 50 is in a status shown in FIG. 3. Then, the user may pivot the buckle 30 to a position shown in FIGS. 4 and 5. As can be seen from FIG. 5, the rotation retaining means 20 rotates together with the buckle 30 such that the free end 531 of the strap 50 is further wrapped around the shafts 21 and 22. In addition, the lateral ends 413 of the engaging portion 411 of the retaining member 41 on the buckle member 30 are engaged with and thus retained in the engaging notches 112 and 122 by the hooks 111 and 121, respectively. The elastic member 42 assures the retaining effect. Referring to FIG. 5, it is appreciated that the free end 531 of the strap 50 includes a fixed section 52 and a movable section 53 in this status such that the user may pull the free end 531 of the strap 50 away from the main body 10 to adjust the strap 50 until a required tightness is reached. This is because the friction between the movable section 53 of the strap 50 (usually made of nylon) and the shafts 21 and 22 (usually made of metal) is small. Nevertheless, displacement of the strap 50 by pulling the lower section (i.e., the fixed section 52) is impossible since friction between the fixed section 52 and the movable section 53 is relatively large owing to a fact that the strap 50 is usually made of nylon. Disengagement of the retaining member 41 from the engaging notches 112 and 122 of the main body 10 can be easily achieved by manually pushing the operative portion 412 of the retaining member 41 along a direction indicated by the arrow in FIG. 5.

According to the above description, it is appreciated that the buckle device in accordance with the present invention provides improved safety, as the operative portion 412 for effecting release of the strap 50 is located away from the free end 531 of the strap 50 when the buckle 30 is in the retained position. This avoids inadvertent release of the buckle 30.

Although the invention has been explained in relation to its preferred embodiment, it is to be understood that many other possible modifications and variations can be made without departing from the scope of the invention as hereinafter claimed.

What is claimed is:

1. A buckle device comprising:

a main body having an engaging section;

a rotational retaining means rotatably mounted to the main body and including a slit through which a free end of a strap is extended;

a buckle having a first end connected to the rotational retaining means to pivot therewith and a second end, the buckle being pivotable between a retained position for retaining the strap in place and a released position allowing movement of the strap; and a retaining member mounted to the second end of the buckle, the retaining member having an engaging portion for releasably engaging with the engaging section of the main body, the retaining member further including an operative portion that is operable to disengage the engaging portion of the retaining member from the engaging section of the main body, the operative portion of the retaining member being located away from the free end of the strap when the buckle is in the retained position, thereby preventing inadvertent actuation of the operative portion of the retaining member.

* * * * *